United States Patent
Smith

[15] 3,695,091
[45] Oct. 3, 1972

[54] METHOD OF AND APPARATUS FOR MEASURING INTENSITY OF PEENING IN SMALL DIAMETER HOLES

[72] Inventor: Glenn D. Smith, Enfield, Conn.
[73] Assignee: Metal Improvement Company, Inc.
[22] Filed: Sept. 28, 1970
[21] Appl. No.: 76,063

[52] U.S. Cl. .................................. 73/11, 73/88 R
[51] Int. Cl. ............................................. G01n 3/34
[58] Field of Search ........... 73/11, 12, 104, 88; 72/53

[56] References Cited

UNITED STATES PATENTS

| | | | |
|---|---|---|---|
| 2,607,213 | 8/1952 | Barton | 73/12 |
| 2,350,440 | 6/1944 | Almen | 73/12 |

*Primary Examiner*—Charles A. Ruehl
*Attorney*—Arthur Frederick and Victor D. Behn

[57] ABSTRACT

The method of measuring intensity of peening in the Almen scale of small diameter holes, such as 0.5 inch or less, consists of a first step of plotting an intensity curve on a reference graph, which intensity curve is proportional to but a fraction of the Almen scale. The intensity curve is plotted by peening, under a predetermined intensity, a number of Almen strips which have been masked to expose only portions of each of the strips so that each strip has an exposed portion differing in width from the others in equal increments of linear measurement and, then, measuring the curvature of each peened strip. Thereafter, peening a portion of an Almen strip which overlies at least one arcuate groove which has chordal dimension equal to the smallest unit width employed to produce the reference graph. After peening the Almen strip in which the same peening apparatus and technique used to peen the holes of the production pieces is utilized, the curvature of the strip is measured. The measurement is plotted on the reference graph to obtain an Almen scale measurement of the peening intensity. If the measurement is for a hole size outside of the intensity curve, the measurement is then extrapolated by using the reference graph to achieve an Almen scale measurement. This Almen value then can be compared with the Almen scale peening intensity called for to insure that the peening meets that requirement and continues to meet the Almen intensity during production peening.

14 Claims, 7 Drawing Figures

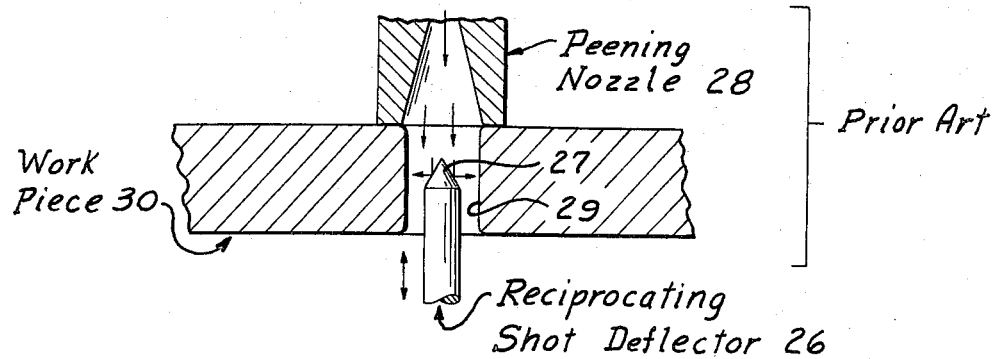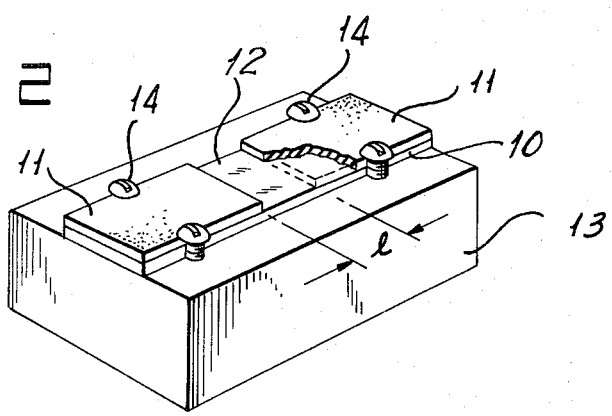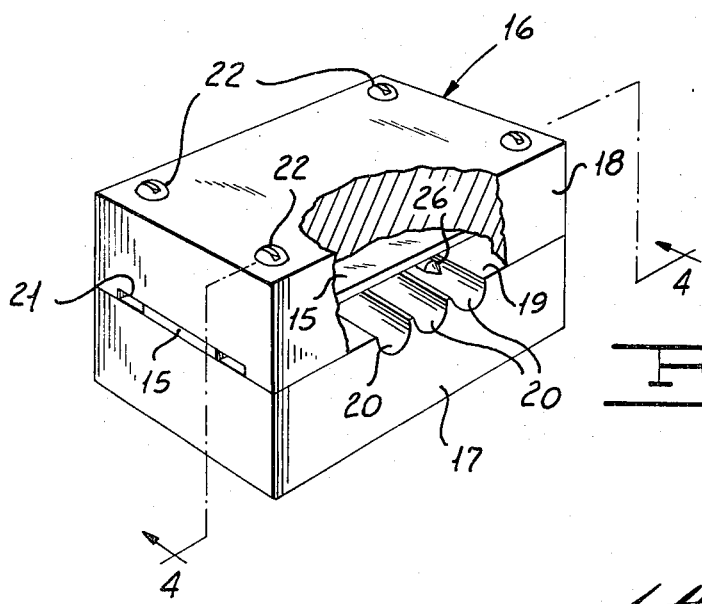

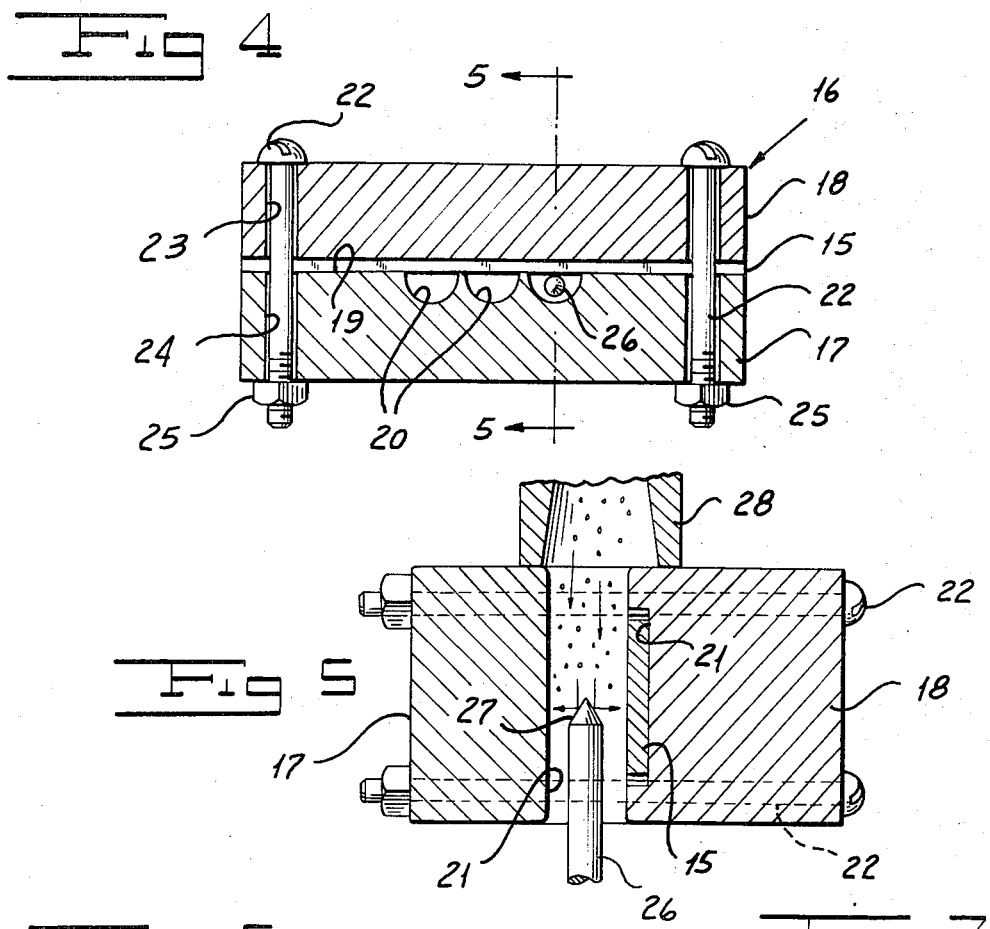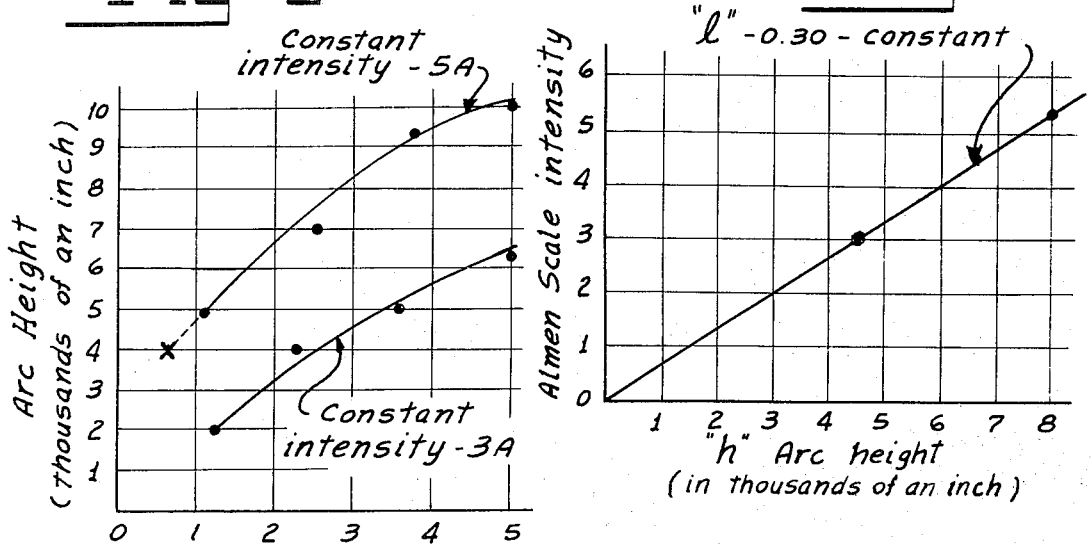

METHOD OF AND APPARATUS FOR MEASURING INTENSITY OF PEENING IN SMALL DIAMETER HOLES

DISCLOSURE OF THE INVENTION

This invention relates to shot peening, and more particularly, to the method of and apparatus for measuring intensity of peening in the Almen scale of small diameter holes and, hence, the monitoring of the peening equipment and its operation to insure peening of pieces to the proper degree.

BACKGROUND OF THE INVENTION

It is well known that while shot peening of a metal surface increases the fatigue strength of a treated part, subjecting the treated surface to that peening beyond "saturation," in other words overpeening, does not improve the treated surface. Accordingly, it is desirable to predetermine the peening technique required for a particular part so that the part can be exposed to proper velocity and size shot for a sufficient length of time to reach but not exceed the point of "saturation." This problem is not capable of a simple solution since intensity of shot peening depends on many variable factors, such as size of shot, material of the shot and the metal surface to be treated, striking velocity of shot which, in part at least, is dependent upon the angular velocity of the throwing wheel or velocity of the entraining air stream, as well as the length of exposure of the peened surface to the "rain" of shot. At present, no quantitive rules have been devised for assigning optimum peening effects.

One useful device for measuring peening intensity is the Almen strip test which, as more fully disclosed in an article by H. F. Moore entitled "*Shot Peening and the Fatigue of Metals*" published by American Foundry Equipment Co., consists of the use of a thin flat strip 3 inches long and three quarters of an inch wide and of a hard steel (as for example Rockwell C hardness of 44–50) which is subjected to shot peening for a specified time with the same combination of size of shot, material of the shot, and striking velocity of shot as is to be used in the peening of a structural or machine part. After exposure to the shot, the curvature of the strip is measured and this curvature resulting from the impaction of peening shot constitutes a measure of the intensity of the stresses set up by the peening in the surface of the strip and, hence, is a measure of peening intensity. The Almen test provides a means of measuring the results of a peening operation and, therefore, after several such tests and the recording of exposure times, serves as a basis for establishing the treatment time for a particular part.

While the above Almen test procedure has proven satisfactory for external surfaces of metal pieces to be peened, it is not useful for measuring peening intensity and monitoring the peening operations of the internal surface of small diameter holes, as for example, holes of about 0.5, or smaller.

Accordingly, it is an object of this invention to provide a method and apparatus for measuring intensity of peening in the surface of small diameter holes in terms of the Almen scale.

SUMMARY OF DISCLOSURE

The method of measuring intensity of peening in the Almen scale of small diameter holes of about 0.5 inches, or less, in diameter comprises the steps of first charting the arc height (h) for various small widths using the conventional Almen test and equipment and shielding or masking each test strip of the A, C or N type, depending upon the intensity of peening desired, to expose each strip with an area of different width, each exposed width changing in size in equal increments, such as 0.10, 0.20, 0.30 inches, et cetera. Each strip is then shot peened at the exposed surfaces at a previously determined peening intensity, such as 3A or 5A Almen. The deformation of each strip is then measured and plotted on a reference graph having width increments $l$ in tenths of an inch and arc heights $h$ thousandths of an inch. Since the arc heights, as herein measured, are not the result of peening the entire strip, the arc heights are not representative of peening intensities as measured by the Almen scale. It, however, provides an intensity curve which is proportionate to an intensity curve as established by the Almen tests. A modified Almen holding block, according to this invention, is provided with at least one, but preferably a plurality of close, spaced, arcuate grooves each of which is of a chordal dimension corresponding to the smallest diametric increment, as in the example of 0.1 inch. A test strip of the type corresponding to the kind used to produce the reference graph (hereinafter referred to as a "modified strip") is secured over the grooves and, using the same peening apparatus and peening shot which is to be used to peen the holes in the production pieces, peen one or more of the surfaces of the modified strip overlying the grooves. The peening apparatus may be a miniaturized version of the type exemplified in the U.S. Pat. to Burney, No. 3,485,073.

The deformation of curvature of the modified strip resulting from the peening is then measured. Since the resultant arc height is not the result of peening the entire modified strip, but only results from the peening of a portion of the strip length, the arc height is not a measure of peening intensity as identified by the Almen scale. It, therefore, is necessary to correlate this arc height to the Almen peening intensity scale. This is done by plotting the arc height on the reference graph for the hole size being peened and, if the point does not fall on the curve of the peening intensity desired, such as 3A or 5A Almen, adjustment of the peening apparatus and/or its operation must be made. In other words, if the arc height plotted point falls below the desired intensity curve increased peening is required and, conversely, if the point falls above the curve, decreased peening is necessary. If the desired peening intensity in the Almen scale is desired for which no curve has been plotted, as for example, below 0.10 inch Almen intensity is determined, from the measured arc height, by extrapolation from the intensity curves on the reference graph by extending or projecting the graph intensity curves toward zero so that desired arc height in the Almen scale is determined. For example, if $l$ is established by peening the surfaces of the modified strip overlying the three grooves of 0.10 inches in diameter, $l$ then is 0.3. If, after peening, the curvature $h$ of the modified strip measures 0.006 inches, which measurement does not represent intensity of peening as measured by the standard Almen scale because the curvature was produced by peening only 0.3 of the total 3 inch length of the strip. However, to correlate this arc height, the intensity curve which is selected as the desired intensity to be employed in the peening operation, as for example a 5A Almen curve, is extended to intersect the abscissa line computed from the following formula:

$$l/k = h/x$$

in which $l$ is the peened length of the modified strip.

$h$ is the arc height.

$k$ is the constant 3 inch standard length of Almen strip.

$x$ is the unknown abscissa line.

In substituting the aforementioned values in the formula, $x$ equals 0.06 as follows:

0.3/3 = 0.006/x
 0.3x = 0.018
 x = 0.06

By examining the reference graph, it can be seen that the intersection of the abscissa 0.06 and the extension of intensity curve (see dotted line) is close to the ordinate 0.004 or 4 on the Almen scale (see $x$ on graph). Thus, if holes are to be peened to an Almen intensity of 4, the foregoing method and apparatus for measuring the intensity provides the means for monitoring such treatment by peening a modified strip according to this invention and measuring its arc height $h$ and if, as in the example, the height measures 0.006 the peening apparatus is operating to produce, as required, an Almen intensity of 4.

In the alternative, a cross plot for $l$ of 0.30 of an inch constant can be constructed on a graph where the coordinates are arc height in thousandths of an inch and Almen intensities. This $l$ curve extends from the zero-zero point through the intersections of the intensity curves, as for example 3A and 5A, and the abscissa line .3 of the reference graph. In the above-mentioned example where the measured arc height is 0.006 inch, the Almen equivalent from the cross plot would be 4 Almen.

BRIEF DESCRIPTION OF THE DRAWINGS

The invention will be more fully understood from the following detailed description thereof when considered in connection with the accompanying drawings, wherein the invention is illustrated and in which:

FIG. 1 is a fragmentary cross-sectional view of one type of prior art apparatus for peening the internal surface of a hole;

FIG. 2 is a perspective view of an Almen strip and holding block showing the surface of the Almen strip masked according to this invention;

FIG. 3 is a perspective view of the strip holding block according to the present invention with part broken away for illustrative purposes only;

FIG. 4 is a longitudinal view in cross section of the strip holding block taken substantially along line 4—4 of FIG. 3; with a reciprocating shot deflector shown in an operative position relative to the strip holding block;

FIG. 5 is a cross-sectional view on a somewhat enlarged scale taken substantially along line 5—5 of FIG. 4 and showing the nozzle and shot deflector therein;

FIG. 6 is a representation of a reference graph according to this invention; and FIG. 7 is a cross plot graph according to the present invention.

DESCRIPTION OF THE PREFERRED EMBODIMENT

The method of and apparatus for measuring and monitoring the intensity of peening in the Almen scale of the surfaces of small diameter holes, as for example holes of a half 0.5 inch, or less, in diameter comprises in accordance with the present invention the first step of plotting one or more reference peening intensity curves as shown in the reference graph in FIG. 6 and designated 3A and 5A, which curves are proportional to but a fraction of the Almen scale.

As is shown in FIG. 2, a number of standard or conventional Almen strips 10 either of the A, C or N type are selected, depending upon the intensity of peening desired, and each is masked or covered with any suitable material 11, such as an adhesive backed rubber tape, to expose various widths of the central portion 12 of the Almen strips 10. In accordance with the present invention, the central portion 12 of each Almen strip 10 changes in width size 1 from a small dimension in equal increments of linear measurement. Preferably, as shown in FIG. 6, the exposed central portions 12 change in width dimensions by one tenth of an inch, as for example, 0.10, 0.20, 0.30, 0.40, and 0.50 to correspond with the designated units of measurement employed in the abscissa coordinate of the intensity graph shown in FIG. 6.

After masking, each of the Almen strips 10 are mounted on a conventional Almen holding block 13 and secured thereto by holding bolts 14. Each exposed surface 12 of each Almen strip 12 is then subjected to peening of a previously predetermined intensity, as for example to an intensity of 5A or 3A under the Almen scale.

After peening of the exposed surface 12, each Almen strip is removed from its associated holding block 13 and the resultant curvature deformation or arc height $h$ is measured. The arc height measurement is then plotted on the graph for the appropriate width of exposed surface to produce a peening intensity curve based upon the selected Almen scale intensity, such as 3A or 5A. Since the arc heights are not the result of peening the entire surface of Almen strip 12, the arc heights are not representative of peening intensities as measured by the Almen scale. However, the arc heights and the resultant curve are proportionate to an intensity curve as would be established by the conventional Almen tests.

The next step, according to the present invention, is to secure an Almen strip 15 of the A, C, or N type, whichever type corresponds to the type of strip 10 employed to produce the referenced peening intensity curves, in a holding block assembly 16 according to this invention. As illustrated in FIGS. 3, 4 and 5, holding block assembly 16 comprises a base or body portion 17 and a top or retaining plate 18. The body portion 17 is parallelepiped in shape and of the size of a conventional Almen holding block such as shown in FIG. 2, and in which the upper surface 19 is provided with at least one, but preferably with a plurality of closely spaced, parallel, semi-circular grooves 20. The grooves 20 extend parallel to the short sides of body portion 17. Each groove 20 is formed to have a chordal dimension corresponding to the smallest unit of linear measure employed to establish the intensity curves 3A and 5A of the graph shown in FIG. 6. Consistent with the graph of FIG. 6, each groove 20 may be constructed and arranged to have a chordal dimension of 0.1 inch. The Almen strip 15 is positioned on surface 19 of body portion 17 to extend between the short sides of the body portion and to overlie grooves 20. The retaining plate 18 has a rectangular shaped recess 21 which is dimensioned in depth to abut the upper surface of Almen strip 15 and dimensioned in width so as not to restrict lateral deformation, if any, of Almen strip 15 upon peening. To secure retaining plate 18 to body portion 17 and clamp Almen strip 15 therebetween, a plurality of bolts 22 are provided. Each bolt 22 extends through aligned holes 23 and 24 in retaining plate 18 and body portion 17, respectively, and is provided with a nut 25 which is turned on the thread shank of the bolt to draw together the retaining plate 18 and body portion 17.

While the holding block assembly 16 has been shown and described as having three grooves 20, it is within the contemplation of the present invention to have one groove or more than three grooves. Obviously, the number of grooves is dependent upon the size holes being peened and the fact that the more of the surface of the Almen strip peened, the greater the resultant accuracy of the tests. For this latter reason, three holes in the instant illustration is preferred.

After Almen strip 15 is secured, as above described, in holding block assembly 16, the surfaces of strip 15 are peened by use of the same internal peening apparatus operating under the same functional conditions as employed in the peening of the hole surfaces in the production work pieces. The internal peening apparatus may be of the type disclosed in the U.S. Pat. to Burney, No. 3,485,073, which apparatus is miniaturized or scaled down to accommodate small diameter holes or may be of the type shown in FIG. 1. In FIG. 1 the peening apparatus, partially shown therein, comprises a shot deflector 26 which has a conical distal end portion 27 and a lance or peening nozzle 28. The shot deflector 26 is disposed within a hole 29 of a work piece 30 and is connected to means (not shown) for reciprocatively moving shot deflector 26 relative to the hole along the longitudinal axis of the hole. The peening nozzle 28 is positioned against the work piece adjacent one end of hole 29 opposite from the conical end 27 of shot deflector 26 to direct a "rain" of shot entrained in pressurized air into hole 29 and against conical end 27. The shot impacting against conical end 27 is deflected radially outwardly as shown by the arrows in FIG. 1 to the surface of hole 29 to thereby impact against the latter. As the shot deflector 26 is moved, the full surface of the hole to be peened is subjected to the impacts of the peening shot. As best shown in FIG. 5, this same peening apparatus operating under the same conditions is employed to peen each of the portions of Almen strip 15, which portions overlie grooves 20. As best illustrated in FIG. 5, nozzle 28 is positioned against the side surfaces of body portion 17 and retaining plate 18 adjacent each groove 20 so as to direct a stream of shot into the groove 20 to be treated. The shot deflector 26 is positioned in the grooves so that shot emitted from nozzle 28 is deflected by conical end portion 27 of shot deflector 26 to impact against the overlying surface of Almen strip 15.

After exposure of Almen strip 15 to the shot, the retaining plate 18 is disconnected from body portion 17 by removal of bolts 22 and the Almen strip is removed for measurement of the extent of curvature deformation induced by the peening. If, for example, the curvature or arc height measures 0.006 of an inch, such measurement is not representative of the peening intensity as measured by the Almen scale because the curvature was produced by shot peening only 0.3 of an inch of the total 3 inches of the Almen strip 15. It is therefore necessary to correlate this arc height to the intensity curve which was produced under a preselected peening intensity, as for example curve 5A. This correlation is achieved by plotting the measured arc height on the reference graph shown in FIG. 6 and comparing the plot with the desired intensity of peening curve. If the plotted point does not fall on the desired curve, but lies above or below the curve, adjustment of the peening apparatus or its operation is necessary to obtain the desired intensity of peening on the work piece. If the arc height plotted point falls below the desired intensity curve, increased peening is required and, conversely, if the plotted point is located above the curve, decreased peening is necessary. If the desired peening intensity in the Almen scale is desired for a hole size for which no reference curve has been produced, as for example, below 0.10 inch, Almen intensity is determined from the measured arc height by extrapolation and extension of the curve toward zero. This extrapolation is made in accordance with the formula $l/k = h/x$ wherein $l$ is the peened length of the strip 15.

$h$ is the arc height.

$k$ is the constant 3 inch standard Almen strip length.

$x$ is the unknown abscissa line.

In substituting the aforementioned values in the formula, $x$ is found to be 0.06, which is computed as follows:

$0.3/3 = 0.006/x$
$0.3x = 0.018$
$x = 0.06$

In extending intensity curve 5A to 0.06 on the abscissa line of the graph shown in FIG. 6, the intensity curve intersects on the ordinate 0.004 or 4 on the Almen scale. Thus, if holes are to be peened to an Almen intensity of 4 and $x$ equals 4, no adjustment of the operating characteristics of the peening apparatus need be made. Obviously, for any value for $x$ above or below 4, a readjustment of the peening apparatus and/or its operation would be required. In other words, if the value of $x$ is below 4, the peening intensity can be increased by increasing the striking velocity of the shot or length of exposure of the hole surface to the shot or even by changing the size or kind of peening shot employed. Conversely, if the value of $x$ is above 4, the peening intensity can be decreased by appropriate alteration of the aforementioned apparatus and/or its operating factors.

In the alternative, the Almen scale can be read directly from the cross plot graph shown in FIG. 7 wherein the Almen equivalent of an arc height of 0.006 of an inch can be directly read to be 4 on the Almen coordinate of the graph. The curve of this graph is produced by treating $l$ as a constant, as for example 0.30 of an inch, and plotting the intersections of the intensity curves and abscissa line 0.3 of the reference graph (FIG. 6) on the cross plot graph and interconnecting those intersections. This graph provides a more readily usable instrument for use by operators of peening equipment in fabrication or metal working plants than the reference graph shown in FIG. 6.

Of course, if an Almen scale intensity of peening desired in the foregoing example is not 4 but 5, then an Almen 4 reading would indicate that adjustment of the peening apparatus or its operation is required to increase the peening intensity to bring the treatment up to the required 5 on the Almen peening intensity scale.

It is believed now readily apparent that the present invention provides a relatively simple and easy method of, and apparatus for, measuring intensity of peening in terms of the Almen scale of small diameter holes of 0.5 of an inch or less and thereby permit the monitoring of the peening of the holes in production work pieces.

Although but one embodiment of the invention has been illustrated and described in detail, it is to be expressly understood that the invention is not limited thereto. Various changes can be made in the procedural steps and the structural arrangement of components without departure from the spirit and scope of the invention, as the same will now be understood by those skilled in the art.

What is claimed is:

1. An Almen strip holding block for use in measuring the intensity of peening of the surfaces of small diameter holes comprising:
   a. a body portion having an Almen strip holding surface;
   b. at least one groove in said strip holding surface and having a dimension in width less than the long side dimension of an Almen strip and a dimension in length at least equal to the short side dimension of an Almen strip; and
   c. means for securing an Almen strip to said holding surface to overlie said groove with the long side of the Almen strip extending transversely of the width of the groove.

2. The apparatus of claim 1 wherein a plurality of closely spaced parallel grooves are provided in said strip holding surface.

3. The apparatus of claim 1 wherein said strip holding surface is rectangular and the groove extends parallel to the short sides of the surface.

4. The apparatus of claim 1 wherein said means comprises a retaining plate secured to the body portion.

5. The apparatus of claim 4 wherein said retaining plate has a recess in its surface adjacent the body portion which recess is dimensioned so the bottom surface of the recess abuts the top surface of the Almen strip and is out of contact with the edges of the Almen strip.

6. A method of measuring in the Almen scale the intensity of peening of the surfaces of small diameter holes in production workpieces comprising the steps of:

a. masking various first Almen strips to expose portions of each of the strips so that each strip has an exposed portion differing in width from the exposed portions of the other masked strips in equal increments of linear measurement;
   b. peening under a predetermined intensity each of the exposed surfaces of the various first Almen strips, and then measuring the curvature of deformation of each of the peened first Almen strips;
   c. plot the deformation measurements on a graph to obtain a reference peening intensity curve proportional to and a fraction of the Almen scale;
   d. forming at least one arcuate groove in the surface of a holding block of the size of an Almen holding block which groove has a chordal dimension equal to the smallest unit width employed to plot the reference peening intensity curve;
   e. disposing a second Almen strip on said holding block to overlie said arcuate groove;
   f. thereafter peening the surface of the second strip overlying said groove with the same peening apparatus and technique used to peen the holes in the production workpieces;
   g. measuring the curvature deformation of the second strip; and
   h. Comparing this deformation measurement of the second strip with the reference peening intensity curve by plotting the deformation measurement on the reference graph.

7. The method of claim 6 wherein the peening of the second Almen strip is achieved by inserting the peening shot discharge device of the peening apparatus in the space defined by the arcuate groove and the second Almen strip so that the rain of shot impacts against the surface of the groove and the inner surface of the second Almen strip.

8. The method of claim 6 wherein said groove is made with a chordal dimension of 0.1 of an inch or less.

9. The method of claim 8 wherein the width of exposed first Almen strips change in equal linear measurement by 0.1 of an inch.

10. The method of claim 8 wherein the first Almen strips are masked to provide a smallest exposed surface of a width of 0.1 inch.

11. The method of claim 6 wherein said groove is made with a chordal dimension of 0.1 of an inch or less and a length about 0.75 inch or less.

12. The method of claim 6 wherein said first Almen strips are masked so that the exposed surfaces extend transversely of the longitudinal axes of the first Almen strips.

13. The method of claim 6 wherein a plurality of arcuate grooves are formed in the surface of the holding block and wherein each of the exposed surfaces of the second Almen strip overlying the grooves are peened.

14. The method of claim 6 wherein extrapolation of the deformation of the second Almen strip is employed to provide an Almen scale measurement when the deformation measurement of the second Almen strip is outside the reference peening intensity curve.

* * * * *